(12) United States Patent
Winkler et al.

(10) Patent No.: US 9,555,957 B2
(45) Date of Patent: Jan. 31, 2017

(54) BEVERAGE CARTRIDGE

(71) Applicant: Keurig Green Mountain, Inc., Waterbury, VT (US)

(72) Inventors: Karl T. Winkler, Bedford, MA (US); Shih-Hao Lai, Stoneham, MA (US); Richard Pasquini, Alfred, ME (US)

(73) Assignee: Keurig Green Mountain, Inc., Waterbury, VT (US)

( * ) Notice: Subject to any disclaimer, the term of this patent is extended or adjusted under 35 U.S.C. 154(b) by 695 days.

(21) Appl. No.: 13/713,361

(22) Filed: Dec. 13, 2012

(65) Prior Publication Data

US 2013/0122167 A1 May 16, 2013

Related U.S. Application Data

(62) Division of application No. 12/874,459, filed on Sep. 2, 210, now Pat. No. 8,361,527.

(51) Int. Cl.
*B65D 85/804* (2006.01)
*A47J 31/36* (2006.01)

(52) U.S. Cl.
CPC ........ *B65D 85/8043* (2013.01); *A47J 31/3695* (2013.01); *B65D 2565/385* (2013.01); *Y10T 29/49826* (2015.01)

(58) Field of Classification Search
CPC ...... A47J 31/407; A47J 31/3695; A47J 31/20; A47J 31/0673; B65D 85/8043; B65D 85/804; B65D 85/816; B65D 2565/385; B65B 29/02; B65B 29/06
USPC ........................................ 426/77–79; 99/295
See application file for complete search history.

(56) References Cited

U.S. PATENT DOCUMENTS

| 240,402 | A | 4/1881 | Gee |
| 370,141 | A | 9/1887 | Hobbs |
| 845,968 | A | 3/1907 | Murray |
| 938,617 | A | 11/1909 | Thomaschewski |
| 1,168,544 | A | 1/1916 | Newlin |
| 1,302,483 | A | 4/1919 | Vierling |
| 2,783,704 | A | 3/1957 | Liebelt |

(Continued)

FOREIGN PATENT DOCUMENTS

| CH | 605293 | 9/1978 |
| DE | 2327264 | 1/1975 |

(Continued)

OTHER PUBLICATIONS

International Search Report and the Written Opinion for International Application No. PCT/US2011/050186, dated Feb. 23, 2012.

*Primary Examiner* — Viren Thakur
*Assistant Examiner* — Chaim Smith
(74) *Attorney, Agent, or Firm* — Wolf, Greenfield & Sacks, P.C.

(57) ABSTRACT

A method, system and cartridge for forming a beverage includes a cartridge having a container defining an interior space, a lid, a filter, and a beverage medium contained in the interior space. The filter may be attached to the lid only, and extend into the interior space to separate first and second chambers of the cartridge. The filter may hold the beverage medium and be arranged so that, when the lid is removed from the container, e.g., by peeling the lid from the container, the filter and beverage medium are removed together with the lid.

20 Claims, 8 Drawing Sheets

(56) References Cited

U.S. PATENT DOCUMENTS

| | | |
|---|---|---|
| 2,926,594 A | 3/1960 | Werner et al. |
| 2,968,560 A | 1/1961 | Goros |
| 2,997,940 A | 8/1961 | Pecoraro et al. |
| 3,199,682 A | 8/1965 | Scholtz |
| 3,260,190 A | 7/1966 | Levinson |
| 3,292,527 A | 12/1966 | Stasse |
| 3,347,151 A | 10/1967 | Ronalds |
| 3,403,617 A | 10/1968 | Lamp |
| 3,462,278 A | 8/1969 | Mahon et al. |
| 3,579,351 A | 5/1971 | Wege et al. |
| 3,615,708 A | 10/1971 | Abile-Gal |
| 3,628,444 A | 12/1971 | Mazza |
| 3,754,463 A | 8/1973 | Vernooy |
| 3,971,305 A | 7/1976 | Daswick |
| 4,136,202 A | 1/1979 | Favre |
| 4,204,966 A | 5/1980 | Morgan, Jr. |
| 4,253,385 A | 3/1981 | Illy |
| 4,254,694 A | 3/1981 | Illy |
| 4,321,139 A | 3/1982 | Auclair |
| 4,353,293 A | 10/1982 | Illy |
| 4,382,402 A | 5/1983 | Alvarez |
| 4,417,504 A | 11/1983 | Yamamoto |
| 4,555,894 A | 12/1985 | Illy |
| 4,581,239 A | 4/1986 | Woolman et al. |
| 4,584,101 A | 4/1986 | Kataoka |
| 4,644,855 A | 2/1987 | Woolman et al. |
| 4,724,752 A | 2/1988 | Aliesch et al. |
| 4,738,378 A | 4/1988 | Oakley et al. |
| 4,806,375 A | 2/1989 | Favre |
| 4,818,544 A | 4/1989 | Seward |
| 4,846,052 A | 7/1989 | Favre et al. |
| 4,859,337 A | 8/1989 | Woltermann |
| 4,873,915 A | 10/1989 | Newman et al. |
| 4,875,408 A | 10/1989 | McGee |
| 4,886,474 A | 12/1989 | Drogo |
| 4,889,041 A | 12/1989 | Mahlich et al. |
| 4,909,136 A | 3/1990 | Newman et al. |
| 4,948,018 A | 8/1990 | Tansley et al. |
| 4,981,588 A | 1/1991 | Poulallion |
| 5,008,013 A | 4/1991 | Favre et al. |
| 5,104,666 A | 4/1992 | Sanvitale |
| 5,197,374 A | 3/1993 | Fond |
| 5,237,910 A | 8/1993 | Chigira |
| 5,242,702 A | 9/1993 | Fond |
| 5,243,164 A | 9/1993 | Erickson et al. |
| 5,272,960 A | 12/1993 | Kinna |
| 5,325,765 A | 7/1994 | Sylvan et al. |
| 5,327,815 A | 7/1994 | Fond et al. |
| 5,343,799 A | 9/1994 | Fond |
| 5,347,916 A | 9/1994 | Fond et al. |
| 5,398,595 A | 3/1995 | Fond et al. |
| 5,398,596 A | 3/1995 | Fond |
| 5,402,707 A | 4/1995 | Fond et al. |
| 5,424,083 A | 6/1995 | Lozito |
| 5,431,276 A | 7/1995 | Lialin |
| 5,472,719 A | 12/1995 | Favre |
| 5,603,254 A | 2/1997 | Fond et al. |
| 5,649,472 A | 7/1997 | Fond et al. |
| 5,656,316 A | 8/1997 | Fond et al. |
| 5,794,519 A | 8/1998 | Fischer |
| 5,806,408 A | 9/1998 | DeBacker et al. |
| 5,840,189 A | 11/1998 | Sylvan et al. |
| 5,897,899 A | 4/1999 | Fond |
| 5,901,635 A | 5/1999 | Lucas et al. |
| 5,913,964 A | 6/1999 | Melton |
| 5,937,737 A | 8/1999 | Karell |
| 5,952,028 A | 9/1999 | Lesser |
| 6,007,853 A | 12/1999 | Lesser |
| 6,026,732 A | 2/2000 | Kollep et al. |
| 6,076,450 A | 6/2000 | DiGiorgio, Jr. |
| 6,440,256 B1 | 8/2002 | Gordon et al. |
| 6,499,388 B2 | 12/2002 | Schmed |
| 6,536,332 B2 | 3/2003 | Schmed |
| 6,589,577 B2 | 7/2003 | Lazaris et al. |
| 6,607,762 B2 | 8/2003 | Lazaris et al. |
| 6,619,188 B1 | 9/2003 | Meador |
| 6,622,615 B2 | 9/2003 | Heczko |
| 6,644,173 B2 | 11/2003 | Lazaris et al. |
| 6,645,537 B2 | 11/2003 | Sweeney et al. |
| 6,658,989 B2 | 12/2003 | Sweeney et al. |
| 6,708,600 B2 | 3/2004 | Winkler et al. |
| 6,740,345 B2 | 5/2004 | Cai |
| 6,748,850 B1 | 6/2004 | Kraan |
| 6,758,130 B2 | 7/2004 | Sargent et al. |
| 6,763,759 B2 | 7/2004 | Denisart |
| 6,786,134 B2 | 9/2004 | Green |
| 6,792,980 B1 | 9/2004 | Cortese |
| 6,799,503 B2 | 10/2004 | Kollep et al. |
| 6,805,041 B2 | 10/2004 | Colston et al. |
| 6,810,788 B2 | 11/2004 | Hale |
| 6,810,899 B2 | 11/2004 | Franz et al. |
| 6,832,542 B2 | 12/2004 | Hu et al. |
| 6,854,378 B2 | 2/2005 | Jarsch et al. |
| 7,028,604 B2 | 4/2006 | Cortese |
| 7,097,074 B2 | 8/2006 | Halliday et al. |
| 7,243,598 B2 | 7/2007 | Halliday et al. |
| 7,316,178 B2 | 1/2008 | Halliday et al. |
| 7,322,277 B2 | 1/2008 | Halliday et al. |
| 7,328,651 B2 | 2/2008 | Halliday et al. |
| 7,461,587 B2 | 12/2008 | Guerrero |
| 2002/0096055 A1 | 7/2002 | Heczko |
| 2003/0005826 A1* | 1/2003 | Sargent et al. ............... 99/279 |
| 2004/0045443 A1 | 3/2004 | Lazaris et al. |
| 2004/0197444 A1 | 10/2004 | Halliday et al. |
| 2005/0051478 A1 | 3/2005 | Karanikos et al. |
| 2005/0183578 A1 | 8/2005 | Mandralis |
| 2005/0266122 A1 | 12/2005 | Franceschi |
| 2006/0065127 A1 | 3/2006 | Dalton et al. |
| 2006/0107841 A1 | 5/2006 | Schifferle |
| 2006/0174769 A1 | 8/2006 | Favre et al. |
| 2006/0236871 A1 | 10/2006 | Ternite et al. |
| 2007/0175334 A1 | 8/2007 | Halliday et al. |
| 2007/0240580 A1 | 10/2007 | Lusareta et al. |
| 2007/0259074 A1 | 11/2007 | Searchilli et al. |
| 2008/0317931 A1 | 12/2008 | Mandralis et al. |
| 2009/0007793 A1 | 1/2009 | Glucksman et al. |
| 2009/0117249 A1 | 5/2009 | Ozanne et al. |
| 2009/0311384 A1* | 12/2009 | MacMahon et al. ........... 426/78 |
| 2010/0101428 A1 | 4/2010 | Fin |
| 2010/0173056 A1 | 7/2010 | Yoakim et al. |
| 2010/0288131 A1* | 11/2010 | Kilber et al. ................... 99/295 |
| 2011/0000377 A1 | 1/2011 | Favre |

FOREIGN PATENT DOCUMENTS

| | | |
|---|---|---|
| DE | 4104695 | 8/1991 |
| DE | 20105161 | 6/2001 |
| EP | 0006175 | 1/1980 |
| EP | 0070403 | 1/1983 |
| EP | 0242556 | 10/1987 |
| EP | 0468080 | 1/1992 |
| EP | 0469162 | 2/1992 |
| EP | 0521188 | 1/1993 |
| EP | 0710462 | 5/1996 |
| EP | 0870457 | 10/1998 |
| EP | 0891734 | 1/1999 |
| EP | 1101430 | 5/2001 |
| EP | 1247480 | 10/2002 |
| EP | 1529739 | 5/2005 |
| EP | 1774878 A1 | 4/2007 |
| EP | 1982933 A1 | 10/2008 |
| FR | 1537031 | 8/1968 |
| GB | 1402799 | 8/1975 |
| WO | WO 9402059 | 2/1994 |
| WO | WO 0200073 | 1/2002 |
| WO | WO 03002423 | 1/2003 |
| WO | WO 2006021405 | 3/2006 |
| WO | WO 2008113779 | 9/2008 |
| WO | WO 2008136026 | 11/2008 |
| WO | WO 2009077488 | 6/2009 |
| WO | WO 2010/01314 A2 | 2/2010 |

* cited by examiner

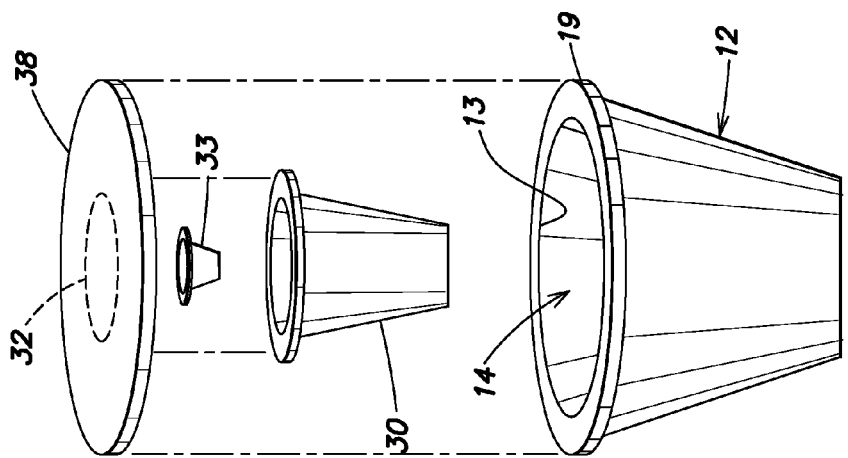
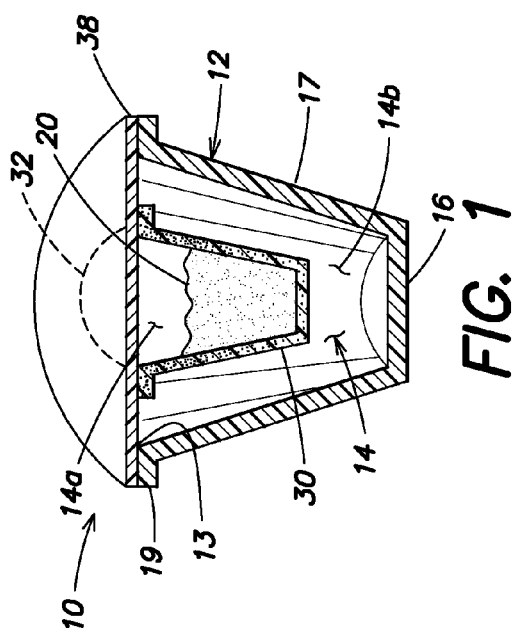
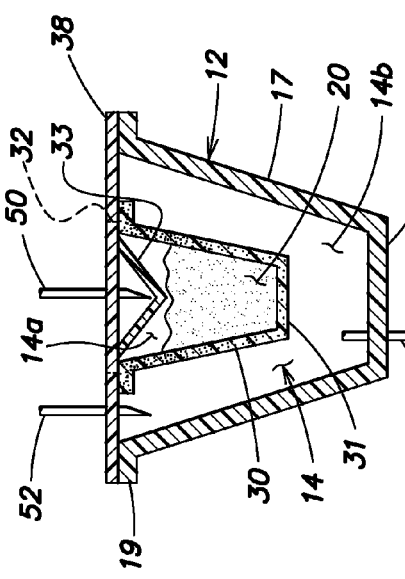

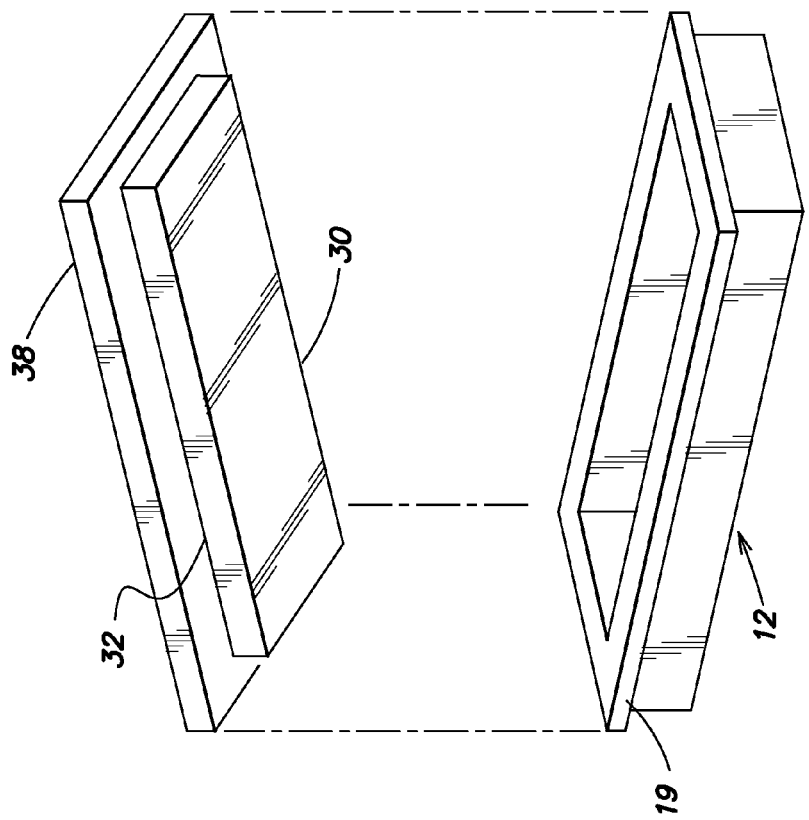
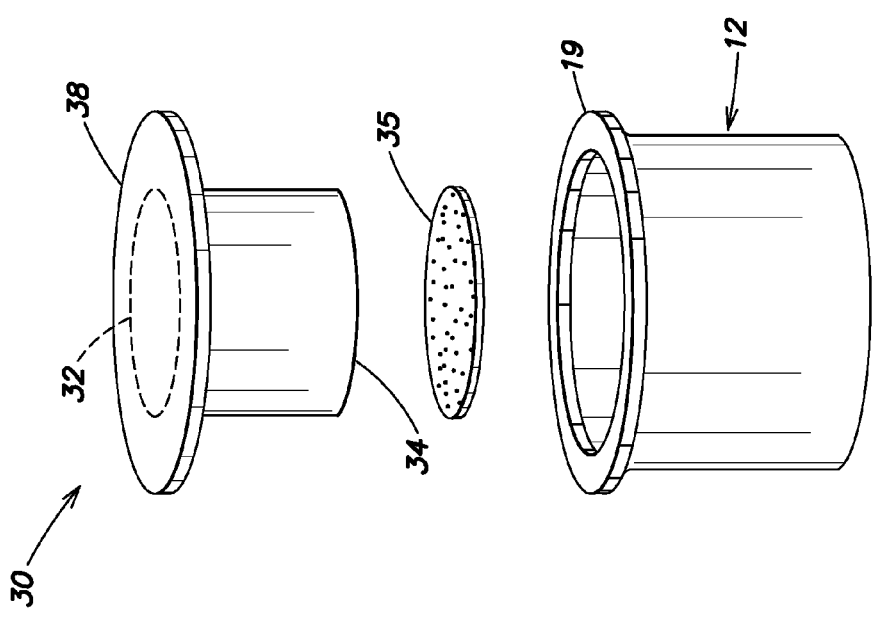

BEVERAGE CARTRIDGE

This application is a divisional of U.S. application Ser. No. 12/874,459, filed Sep. 2, 2010, which is hereby incorporated by reference in its entirety.

BACKGROUND

1. Field of Invention

This invention relates to a beverage cartridge to be used with a beverage forming system, such a single-serve coffee maker.

2. Related Art

Cartridges for use with beverage forming machines are well known, and may include one or more filters as well as a beverage medium, such as ground coffee beans, tea leaves, etc. In some cartridges, the filter is located between two or more portions of an interior space of the cartridge, e.g., one portion in which a beverage medium is located, and a second portion into which liquid that has passed through the filter may flow. An example of one such cartridge is disclosed in U.S. Pat. Nos. 5,840,189 and/or 6,607,762, which may be used with a beverage making machine like that described in U.S. Pat. No. 7,398,726. (U.S. Pat. Nos. 5,840,189; 6,607,762; and 7,398,726 are hereby incorporated by reference in their entirety.) In use, the beverage forming machine introduces a fluid into the cartridge to interact with the beverage medium. In some machines, a piercing outlet needle of the machine is used to pierce a surface of the cartridge (e.g., a bottom wall of the cartridge container or the cartridge lid) permitting the liquid that has interacted with the beverage medium to flow through the filter and exit the cartridge.

SUMMARY OF INVENTION

The inventors have appreciated that many beverage cartridges do not permit the easy separation of beverage cartridge components after use, e.g., for recycling and/or composting. For example, commonly available beverage cartridges include metallic components (such as a foil), polymer components (such as polystyrene, polypropylene, EVOH, polyethylene, and others), a paper component (such as a porous paper filter), and/or an organic plant material component (such as coffee grounds or tea leaves). The metallic and/or polymer components are typically included to preserve the quality of the beverage medium contained in the cartridge, e.g., to protect coffee grounds or tea leaves from moisture, oxidation or other environmental conditions that might ruin the beverage medium's ability to make a quality drink. As a result, many sealed beverage cartridges are able to maintain coffee grounds, tea leaves or other ingredients fresh for weeks or months. In contrast, a porous or permeable container, such as a conventional tea bag-type device or coffee pod, is incapable of maintaining roast and ground coffee fresh for much more than a few days or a week even when exposed to the relatively benign conditions of the typical kitchen cabinet. Although effective in maintaining freshness of a beverage medium, the way in which the various components of impermeable beverage cartridges are constructed can often make the separation of the components difficult and/or messy. For example, in some coffee cartridges, an attempt to remove the coffee grounds for composting after use of the cartridge can result in grounds being scattered or otherwise released in an uncontrolled manner. This results in many users being discouraged from recycling or composting cartridge components, even if the components are readily degradable or recyclable.

The inventors have developed methods and apparatus for making and using a beverage cartridge that, at least in some embodiments, allows for the easier and more mess-free separation of at least some components of a cartridge. For example, in accordance with one aspect of the invention, a cartridge including a container and a foil lid covering an opening of the container may have the filter joined to the lid so that removal of the lid from the container also removes the filter and spent coffee grounds or other beverage media together with the lid. Thus, after using the cartridge to form a beverage, a user may tear the lid from the container to remove not only the lid, but also the filter and coffee grounds. Since the coffee grounds may be contained in the filter, the grounds may be better contained, reducing any potential mess that may be made during the separation process. With the lid separated, the container may be recycled or composted, e.g., the container may be made of a recyclable and/or compostable polymer that must be separated from the foil lid and other components for proper recycling. Similarly, the separated coffee grounds or other beverage media may be composted or recycled in another way.

Some aspects of the invention also provide for a beverage cartridge that allows for piercing both inlet and outlet openings in the lid of the cartridge while having a simplified interior construction. Some prior cartridge arrangements that permit both inlet and outlet piercing of a lid, such as those described in U.S. Pat. Nos. 6,607,762 or 7,607,385, have relatively complicated internal structures and/or container arrangements. For example, in one illustrative embodiment, a cartridge in accordance with aspects of the invention may include a simple, cup-shaped container, a cup-shaped filter and a planar lid while allowing for both inlet and outlet openings to be formed in the lid. In this embodiment, there is no need for a complex structure, whether for the container, filter or lid. Instead, a simple filter may be attached only to the lid, and the lid attached only to the container, enabling relatively simple separation of these components after use.

In one illustrative embodiment, a cartridge for use in forming a beverage includes a container having an interior space, a rim attached to the container and defining an opening to the interior space, and a lid attached to the rim and closing the opening of the container. A filter may be attached to the lid at a periphery located away from the rim with the filter extending from the periphery into the interior space and separating a first chamber from a second chamber in the interior space. The filter may be unattached to the container, e.g., in areas away from the rim. A beverage medium may be located in the interior space and arranged to interact with liquid introduced into the container to form a beverage. For example, the beverage medium may be located in the first chamber so that liquid that interacts with the medium to form a beverage may flow through the filter and into the second chamber. The lid may have a first portion that is pierceable by a beverage machine to accommodate an inflow of pressurized liquid into the interior space to form a beverage. In some arrangements, the lid may have a second portion that is pierceable by a beverage machine to accommodate an outflow of beverage from the second chamber. For example, the first portion may be located at a center of the lid and inside the periphery, and the second portion may have an annular shape around the first portion. In another arrangement, the container may have a surface, e.g., at the bottom of the container, arranged to be pierced by a beverage machine to permit the beverage to exit the interior space from the bottom of the container.

The cartridge may include beverage medium in the first chamber and/or in the second chamber. For example, the cartridge may include roast, ground coffee in the first chamber and a creamer in the second chamber, allowing the cartridge to form a cream-and-coffee beverage. A flow distributor may be located between the first portion of the lid and the beverage medium, e.g., to help prevent contact of a fluid inlet with the beverage medium located in the first chamber. This may help prevent fouling of a liquid inlet that might be caused if the beverage medium is permitted to contact the inlet.

The cartridge may have a variety of different arrangements, e.g., the container may have a frustoconical shape with a sidewall and a bottom, the filter may have a fluted or conical shape, and the filter may be attached only to the lid. The lid may be peelably removable by hand from the rim, so that the filter and the beverage medium (if in the filter) are removable from the container together with the lid upon removal of the lid from the rim. In another embodiment, the container may have a sidewall with a spout feature, e.g., that helps to direct beverage in the cartridge to an outlet and/or helps a user peel a lid from the rim.

In another illustrative embodiment, a method for forming a beverage includes providing a cartridge having a container with an interior space having first and second chambers, a rim defining an opening to the interior space, a lid attached to the rim and closing the opening of the container, and a filter attached to the lid at a periphery that is spaced inwardly and away from the rim. The filter may extend from the periphery into the interior space and separate the first and second chambers, e.g., so that liquid in the first chamber must flow through a permeable portion of the filter to enter the second chamber. A beverage medium may be located in the interior space and interact with liquid introduced into the container to form a beverage. The lid may be pierced near a center of the lid and away from the rim to form a first opening to access the first chamber, and liquid may be introduced into the first chamber via the first opening. A beverage may be formed by interaction of the liquid with the beverage medium, and the lid may be pierced to form a second opening to access the second chamber and remove the beverage from the cartridge via the second opening.

The method may include other steps, such as engaging the rim with a clamping mechanism prior to introducing liquid into the first chamber. This may permit a beverage machine to securely hold the cartridge and form a seal with the cartridge to resist leakage of beverage. In one embodiment, the lid may be pierced to form a third opening to vent the interior space, e.g., to allow the cartridge to fill with liquid and/or to drain the beverage from the cartridge. The lid may be approximately planar and be positioned in a downward facing orientation, e.g., with the container above the lid and the lid in a plane that is transverse to a horizontal plane. In one embodiment, the plane is at an angle of about 20 degrees to 70 degrees to the horizontal plane. This inverted orientation of the cartridge may help better wet the beverage medium and/or aid in draining the beverage from the cartridge. For example, the first opening where liquid is introduced into the cartridge may be positioned above the second opening where beverage exits the cartridge.

In yet another embodiment, a method of manufacturing a cartridge for use with a beverage brewing machine includes providing a container having an interior space and a rim defining an opening into the interior space, attaching a filter to a lid at a periphery, and attaching the lid to the rim to close the opening after the filter is attached to the lid. The filter may be attached to the lid such that the periphery is spaced away from the rim and the filter extends from the periphery into the interior space and separates a first chamber from a second chamber in the interior space. A beverage medium may be provided in the interior space, e.g., in the first chamber, and be arranged to interact with liquid introduced into the container to form a beverage. The lid may have first and second portions that are pierceable by a beverage machine to respectively accommodate an inflow of liquid into the first chamber to form a beverage and accommodate an outflow of beverage from the second chamber.

In another embodiment, a beverage system may include a beverage machine comprising a cartridge receiver arranged to receive a cartridge, a fluid inlet arranged to introduce liquid into the cartridge via a first opening in the cartridge, and a fluid outlet arranged to receive a beverage from the cartridge via a second opening in the cartridge. The cartridge may be arranged to be received by the cartridge receiver of the beverage machine and include a container having an interior space and a rim defining an opening to the interior space, a lid attached to the rim and closing the opening of the container, and a filter attached to the lid at a periphery located away from the rim. The filter may extend from the periphery into the interior space and separate a first chamber from a second chamber in the interior space. A beverage medium may be located in the interior space and be arranged to interact with liquid introduced into the container to form a beverage. The lid may have first portion that is pierceable by the beverage machine to accommodate an inflow of liquid via the fluid inlet into the first chamber to form a beverage, and a second portion that is pierceable by the beverage machine to accommodate an outflow of beverage from the cartridge to the fluid outlet. The beverage machine may include a clamping mechanism that engages the rim of the cartridge, and/or a vent to vent the interior space of the cartridge via a third opening in the lid. The lid may be approximately planar and the cartridge receiver may be arranged to position the lid in a downward facing orientation with the container above the lid and the lid in a plane that is transverse to a horizontal plane, e.g., so that the fluid inlet is positioned above the fluid outlet.

In another embodiment, a cartridge for use in forming a beverage may include a container having an interior space, a rim attached to the container and defining an opening to the interior space, a lid attached to the rim and closing the opening of the container, and a flow distributor attached to the lid at a periphery located away from the rim. The flow distributor may extend from the periphery into the interior space and separate a first area inside the flow distributor from a second area in the interior space. The flow distributor may be unattached to the container and arranged to alter flow of liquid introduced into the first area. A beverage medium may be included in the interior space (e.g., in the second area) and arranged to interact with liquid introduced into the container to form a beverage. The lid may have a first portion that is pierceable by a beverage machine to accommodate an inflow of liquid into the first area, and a second portion that is pierceable by a beverage machine to accommodate an outflow of beverage from the cartridge. In one embodiment, a filter may be attached to the lid at a filter periphery located away from the rim so that the filter extends from the filter periphery into the interior space and separates a first chamber from a second chamber in the interior space. The flow distributor may be located in the first chamber, e.g., to help distribute the flow of liquid over the beverage medium.

In one embodiment, the cartridge may further include a filter attached to the lid at a filter periphery located away from the rim. The filter may extend from the filter periphery into the interior space and separate a first chamber from a second chamber in the interior space. The beverage medium may be in the first chamber (and/or the second chamber) and the flow distributor may be located between the first portion of the lid and the beverage medium, e.g., to help distribute incoming liquid relative to the beverage medium. The lid may be peelably removable by hand from the rim, and the filter and the flow distributor may be attached to the lid such that the filter, the flow distributor and the beverage medium are removable from the container together with the lid upon removal of the lid from the rim.

These and other aspects of the invention will be apparent from the following description and claims.

BRIEF DESCRIPTION OF DRAWINGS

Aspects of the invention are described below with reference to the following drawings in which like numerals reference like elements, and wherein:

FIG. 1 is a side cross-sectional view of a cartridge in accordance with aspects of the invention;

FIG. 2 is an exploded perspective view of the cartridge of FIG. 1;

FIG. 3 is a side cross-sectional view of the cartridge of FIG. 1 after a surface of the cartridge is pierced by a piercing element;

FIG. 6 shows an exploded view of yet another illustrative embodiment of a cartridge in accordance with an aspect of the invention;

FIG. 7 shows an exploded view of yet another illustrative embodiment of a cartridge in accordance with an aspect of the invention;

DETAILED DESCRIPTION

Figure 5:
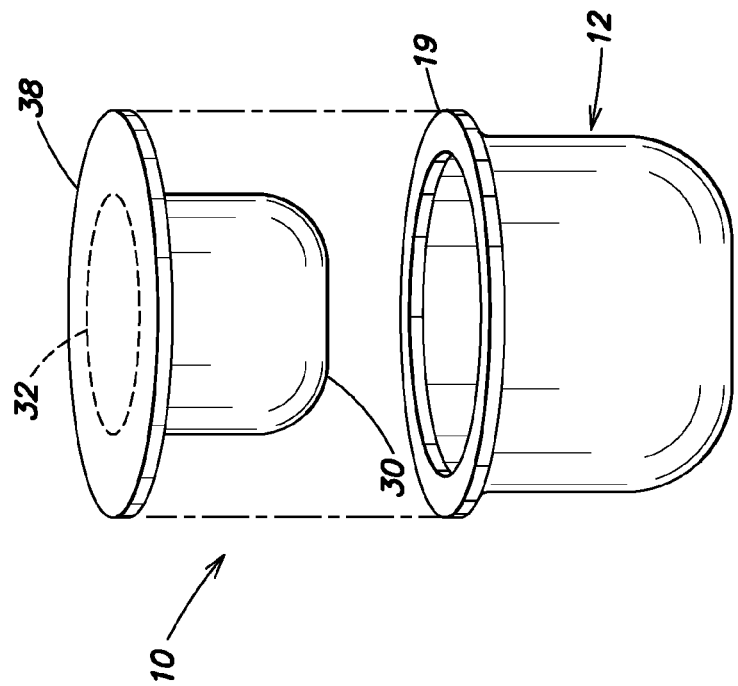
FIG. 5 shows an exploded view of another illustrative embodiment of a cartridge in accordance with an aspect of the invention.

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

FIGS. 1 and 2 show a side cross-sectional view and an exploded perspective view, respectively, of an illustrative cartridge 10 that incorporates one or more aspects of the invention. The cartridge 10 may be used in a beverage machine to form any suitable beverage such as tea, coffee, other infusion-type beverages, beverages formed from a liquid or powdered concentrate, etc. Thus, the cartridge 10 may contain any suitable beverage medium 20, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriceuticals, etc.), and/or other beverage-making material (such as powdered milk or other creamers, sweeteners, thickeners, flavorings, and so on). In one illustrative embodiment, the cartridge 10 contains a beverage medium 20 that is configured for use with a machine that forms coffee and/or tea beverages, however, aspects of the invention are not limited in this respect.

In this illustrative embodiment, the cartridge 10 includes a container 12 that includes an interior space 14 having a first chamber 14a and a second chamber 14b that are separated by a filter 30. It should be understood, however, that other additional chambers in the interior space and/or sub-portions or areas of the first and second chambers, may be provided in other embodiments. For example, it is possible for the cartridge to have three spaces that separated by two filters (e.g., a first filter separates two portions of a first chamber and a second filter separates the first and second chambers), and so on. In another embodiment, the first or second chamber may be separated into two portions by a venturi or other feature that introduces air into a beverage. Thus, the first and/or second chambers may be divided or otherwise separated into two or more portions or areas by filters, walls, dividers, passageways, and other features.

In this embodiment, the container 12 may have a frusto-conical cup shape with a sidewall 17 and an opening 13. However, in other embodiments, the container 12 may have a fluted, conical, or cylindrical shape, may be in the form of a square or rectangular cup, a domed cup, a sphere or partial sphere, or other suitable form, may have a fluted, corrugated, or otherwise shaped sidewall, and so on. Also, the container 12 need not necessarily have a defined shape, as is the case with some beverage sachets and pods. For example, although the container 12 in this embodiment has a relatively rigid and/or resilient construction so that the container 12 tends to maintain its shape, the container 12 could be made to have a more compliant and/or deformable arrangement, e.g., like a sachet container made from a sheet of deformable material. Thus, an interior space defined by the container 12 may be formed only after the container material is formed around a beverage medium, filter and/or other cartridge components, similar to when two filter paper layers (container material) are joined together around a charge of coffee grounds to form a pod or other form of cartridge.

If the container 12 includes an opening 13, the opening 13 may be closed by a lid 38, e.g., a foil and polymer laminate material that is attached to a rim 19 of the container 12. (Although in this embodiment the rim 19 is arranged as an annular flange-like element, the rim 19 may be arranged in other ways. For example, the rim 19 may be the top edge of the sidewall 17 without any flange element.) The container 12 and/or the lid 38 may provide a barrier to moisture and/or gases, such as oxygen. For example, the container 12 may be made of a polymer laminate, e.g., formed from a sheet including a layer of polystyrene or polypropylene and a layer of EVOH and/or other barrier material, such as a metallic foil. Such an arrangement may provide suitable protection for the beverage medium 20, e.g., from unwanted exposure from moisture, oxygen and/or other materials. It should be understood, however, that the container 12 and/or the lid 38 may be made of other materials or combinations of materials, such as biopolymers, compostable polymers, paper, foils, etc.

In accordance with an aspect of the invention, the filter 30 may be attached to the lid 38 at a periphery 32 that is spaced inwardly and away from the rim 19. In addition, the filter 30 may extend from the periphery 32 at least partially into the interior space 14. As mentioned above, the filter 30 may be arranged between the first and second chambers 14a and 14b of the interior space 14 so that liquid in the first chamber 14a of the interior space (e.g., that interacts with beverage medium 20) flows through the filter 30 and toward the second chamber 14b of the interior space 14 before exiting the container 12. The filter 30 may function to remove materials over a certain size from a liquid, e.g., may remove coffee grounds from liquid in the first chamber 14a, allowing a coffee beverage to pass through the filter 30 to the second chamber 14b. For example, the filter may include a piece of filter paper that is arranged to allow a liquid and dissolved and/or suspended materials of a certain size to pass, yet prevent relatively large particles from flowing through the filter. Of course, the filter 30 may have multiple stages, e.g., a coarse filter portion that filters out relatively large particles, followed by a fine filter portion that filters relatively smaller particles, and so on. In addition, the filter 30 may include one or more portions that function to filter liquid passing through the filter 30, as well as portions that are impermeable or otherwise restrict flow. Thus, the filter 30 may include two or more separate components, if desired. For example, the filter 30 may include a rigid, impermeable plastic sleeve that is attached to the lid 38 at the periphery 32. At a location away from the lid 38, a porous filter paper may be attached to the sleeve. Thus, not all portions of the filter need be permeable to liquids. The filter 30 may also have areas with different permeability, e.g., to help direct flow toward one or more areas of the filter 30. For example, regions of the filter 30 near the lid 38 in FIG. 1 may have a relatively lower permeability as compared to regions further away from the lid 38. This may help encourage flow through the beverage medium 20 toward lower regions of the filter 30, potentially improving the dissolution of materials in the medium 20 into the liquid.

The filter 30 may also, or alternately, function to help prevent the movement of materials from the second chamber 14b to the first chamber 14a. For example, the cartridge 10 may include a beverage medium 20 in the second chamber 14b and no beverage medium 20 in the first chamber 14a. In this case, the filter 30 may help prevent contact of the beverage medium 20 with a needle or other liquid inlet that pierces the lid 38 to introduce water or other liquid into the cartridge 10. For example, some beverage media 20, such as powdered drink mixes, can clog or otherwise foul an inlet needle if allowed to contact the needle. The filter 30 may help prevent such contact, helping to maintain proper operation of the cartridge and preparation of a beverage.

In some embodiments, the filter 30 may be the only element in the interior space 14 that separates the first and second chambers 14a and 14b (as in the FIGS. 1-3 embodiment). In other arrangements, other components, such as walls, ribs, or other structures in addition to the filter 30, may physically separate two or more portions of the interior space 14 from each other. However, regardless of the manner in which the filter is arranged, a permeable portion of the filter 30 may be the only component that separates or divides two or more portions of the interior space 14 in a flow-wise sense, e.g., liquid may need to flow through the permeable portion of the filter 30 to pass from the first chamber 14a to the second chamber 14b.

In this illustrative embodiment, the filter 30 may have a substantially frustoconical shape with fluted or pleated sidewalls and a generally flat bottom 31, as shown. However, the filter 30 may have any suitable shape, such as a cylindrical shape, a square cup shape, a domed shape, a flat sheet, or other. The filter 30 may be the attached to the lid 38 in any suitable way, such as by an adhesive, thermal welding, ultrasonic welding, chemical bonding, crimping or other mechanical bonding, etc. As will be understood, the shape of the periphery 32 may depend on the shape of the filter, at least at an upper end of the filter 30. In this embodiment, the periphery 32 has a circular shape, but oval, rectangular, triangular, irregular and other shapes are possible. In this illustrative embodiment, the filter 30 may include a permeable filter paper made of a combination of polypropylene and cellulose materials and may be attached to the lid 38 at an upper portion of the filter 30 by thermal welding. As can be seen in FIGS. 1-3, the upper portion of the filter 30 that is attached to the lid 38 may have an annular, or washer-like shape that extends radially outwardly as shown from the periphery 32 (or inwardly in other embodiments), but such radial extension is not required. In some embodiments, the portion of the filter attached to the lid 38 may extend radially outwardly from the periphery to, and over, the rim 19 such that part of the filter 30 is sandwiched between the lid 38 and the rim 19.

When using the cartridge 10 to form a beverage, the lid 38 and/or the container 12 may be pierced to introduce liquid into the cartridge and receive beverage from the cartridge. (As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.) To introduce liquid into the cartridge, for example, as shown in FIG. 3, a portion of the lid 38 generally circumscribed by the periphery 32 may be pierced by an inlet piercing element 50 (e.g., a needle) so that water or other liquid may be injected into the cartridge 10. Other inlet piercing arrangements are possible, such as multiple needles, a shower head, a non-hollow needle, a cone, a pyramid, a knife, a blade, etc. A beverage machine that uses the cartridge may include multiple piercing elements of the same type or of different types, as the invention is not limited in this respect. In another arrangement, a beverage machine may include a piercing element (such as a spike) that forms an opening and thereafter a second inlet element (such as a tube) may pass through the formed hole to introduce liquid into (or conduct liquid out of) the container. In other embodiments, the lid 38 may be pierced, or otherwise effectively opened for flow, by introducing pressure at an exterior of the lid 38. For example, a water inlet may be pressed and sealed to the lid 38 exterior and water pressure introduced at the site. The water pressure may cause the lid 38 to be pierced or otherwise opened to allow flow into the cartridge 10. In another arrangement, the lid 38 may include a valve, conduit or other structure that opens when exposed to a suitable pressure and/or when mated with a water inlet tube or other structure.

The cartridge 10 may also be penetrated by an outlet piercing element 52 (e.g., a needle) at a bottom 16 of the container 12, or at a second portion of the lid 38 outside of the periphery 32 and apart from the inlet opening. As with the inlet piercing arrangement, the outlet piercing arrangement may be varied in any suitable way. Thus, the outlet piercing element 52 may include one or more hollow or solid needles, knives, blades, tubes, and so on. Alternately, the cartridge 10 may include a valve, septum or other element that opens to permit beverage to exit when liquid is introduced into the cartridge, but otherwise remains closed (e.g., to protect the beverage medium from external conditions such as oxygen, moisture or others). In such a case, no piercing element for forming the outlet opening is necessarily required although may be used, e.g., to allow the valve or other element to open. Also, in this illustrative embodiment the piercing element 52 remains in place to receive beverage as it exits the opening formed in the container 12 or lid 38. However, in other embodiments, the piercing element 52 may withdraw after forming an opening, allowing beverage to exit the opening and be received without the piercing element 52 being extended into the cartridge 10.

In another aspect of the invention, the cartridge may include an element that helps to distribute liquid that is introduced into the cartridge to the beverage medium and/or that helps resist contact of a fluid inlet with the beverage medium. In the illustrative embodiment shown in FIGS. 1-3, the cartridge includes a flow distributor 33 that is positioned between the inlet 50 and the beverage medium 20. In this embodiment, the flow distributor 33 functions to help incoming water or other liquid more evenly wet the beverage medium 20 as well as help resist contact of the inlet 50 with the beverage medium. Of course, the performance of both functions is not required, e.g., the flow distributor 33 may influence the flow of liquid into the cartridge, but not resist contact of beverage media with the inlet. More even wetting of the beverage medium 20 or other flow control can help the cartridge produce a desired beverage, e.g., by more completely dissolving materials in the beverage medium 20, by improving extraction of soluble and insoluble substances from the beverage medium 20, by improving flow of beverage through the filter, and so on. Reducing contact of the beverage medium 20 with the inlet 50 can help reduce the likelihood of clogging of the inlet and/or leaving a portion of the beverage medium on the inlet 50 (which may have an affect on the taste of a next beverage made when the inlet 50 pierces a different cartridge having a different type of beverage medium).

In this illustrative embodiment, the flow distributor 33 is formed of a permeable material, such as a filter paper, that is attached to the lid 38 at a location within the periphery 32. Thus, the flow distributor 33 can help prevent the streaming of incoming liquid in a single direction (or two or more specific directions) that might cause the liquid to "tunnel" through the beverage medium 20. Such "tunneling" can cause a short circuit where liquid does not sufficiently interact with the beverage medium 20, resulting in an unacceptably weak product. The flow distributor 33 may take other forms, however, such as a perforated disc placed on the beverage medium 20, a piece of filter paper placed on the beverage medium 20, and others. Thus, the flow distributor 33 need not be attached to the lid 38 or the filter 30, but instead may be simply placed in the first chamber with the beverage medium 20. In addition, or alternately, the inlet needle 50 or other fluid inlet may be arranged to help distribute water or other liquid, e.g., by directing multiple streams in several different directions across the beverage medium, and so on. The flow distributor 33 may be arranged to be contacted by the inlet needle 50, or to avoid contact with the needle 50. If the flow distributor 33 contacts the needle 50, is may include materials that are sufficiently tough and/or sufficiently rigid to reduce damage to the flow distributor 33 by the inlet needle 50. Non-limiting examples of such a material include: a material that is flexible, but tough; a material that is rigid, but brittle; a material that is stretchable or resilient, but tear resistant; a material that is tough and rigid, etc.

Figure 4:
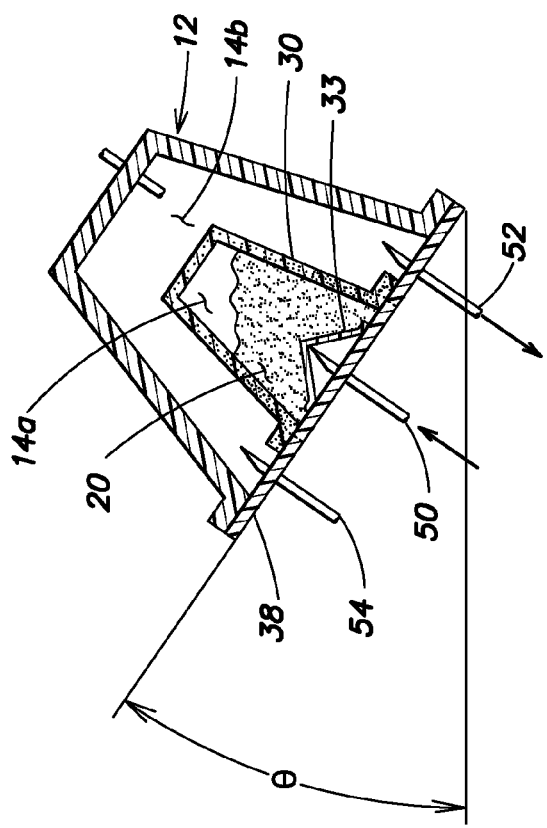
FIG. 4 shows a side cross-sectional view of the cartridge of FIG. 1 in an inverted orientation with the lid below the container and in a plane that is transverse to a horizontal plane.

Another aspect of the invention relates to the formation of a beverage using a cartridge like that described above and/or having similar features. As discussed above, the cartridge may take a variety of different arrangements, but in this illustrative embodiment has the same general form as that shown in FIGS. 1-3. The cartridge may be used with a suitable beverage machine, such as any one that is capable of introducing chilled, carbonated and/or heated water into the cartridge and receiving a formed beverage from the cartridge. In one aspect of the invention, a cartridge may be used to form a beverage while the cartridge is positioned with the lid 38 below the container 12, as shown generally in FIG. 4. Although the cartridge 10 could be used with the lid 38 (or a portion of the lid) lying in a horizontal plane or a vertical plane, one aspect of the invention positions the lid 38 in a plane that is transverse to the horizontal plane, e.g., in a plane that is at an angle θ of about 20 to 70 degrees to the horizontal plane. This orientation may provide several advantages including enabling more complete wetting of the beverage medium and/or more complete draining of beverage from the cartridge. The orientation shown in FIG. 4 may enable better wetting or other interaction of liquid introduced into the cartridge with the beverage medium 20 because the liquid may be able to "flood" the interior space of the cartridge 10, e.g., fill the first chamber 14a and at least part of the second chamber 14b with liquid such that all or most of the beverage medium 20 is saturated with the liquid. In accordance with another aspect of the invention, the cartridge 10 may be provided with a vent that is separate from the beverage outlet that permits the release of gas from the cartridge as it is filled with liquid. The vent may be provided by a one-way valve (e.g., a septum, duck bill valve, or other) that is attached to the lid 38 or container 12 and opens in response to increased pressure in the cartridge 10, may be provided by a piercing element 54 that pierces the lid 38 (as shown in FIG. 4) or container 12 to allow gas and/or liquid to escape, and other arrangements. (Although the element 54 is described as providing a vent for the cartridge 10, the element 54 may provide other functions in addition, or in the alternate, to venting the cartridge. For example, the element 54 may provide an alternate liquid inflow and/or outflow path, and/or may be used to introduce air pressure into the cartridge 10, e.g., to help purge the cartridge 10 of any remaining beverage at the end of a beverage creation cycle. Also, although the element 54 is shown as a single piercing needle, the element 54 may be arranged in other ways like the inlet and outlet elements 50 and 52. For example, the element 54 may include one or more blades, tubes, knives, solid or hollow needles, and so on to provide venting, liquid inlet or outlet, and/or purging functions.)

Having the lid 38 in a plane transverse to the horizontal may also allow for better draining of beverage from the cartridge 10. That is, since the cartridge 10 is tilted so that one side of the cartridge is lower than the other, beverage may tend to drain to the lowered side of the cartridge. Also, the beverage outlet opening may be formed at or near this lowered side so that all or most of any liquid in the cartridge 10 can be removed. This feature may provide at least two benefits including reduced dripping or unwanted leakage of liquid when a user removes the cartridge from the beverage machine and/or more complete and efficient usage of the beverage medium since little or no beverage would be left in the cartridge.

Although the embodiments described above include a beverage medium 20 only in the first chamber 14a, those embodiments may include a beverage medium (either the same or different as that in the first chamber 14a) in the second chamber 14b or other portions of the cartridge. For example, a cartridge may include roast and ground coffee in the first chamber 14b, and a creamer and sweetener in the second chamber 14b, enabling the cartridge to form a cappuccino- or latte-like beverage. In another embodiment, the first chamber 14a may include coffee grounds and the second chamber 14b may include a hot chocolate material, allowing the cartridge to form a mocha-type beverage. Other combinations will occur to those of skill in the art, such as leaf tea in the first chamber and a dried fruit material in the second chamber, a dried fruit material in the first chamber and creamer/sweetener in the second chamber, and so on. In some embodiments, another filter may be provided, e.g., to separate beverage media in the second chamber from the fluid outlet. For example, a filter may be attached to the lid 38 in an area where an outlet needle pierces the lid 38 to allow beverage to exit the cartridge, but only after passing through the additional filter.

As mentioned above, aspects of the invention may be implemented in cartridges having different shapes, sizes and/or configurations. For example, FIG. 5 shows an illustrative embodiment of a cartridge 10 that includes a relatively rigid or stiff rim 19 (e.g., including an annular shaped element made of a plastic material) attached to a container 12 made of a relatively flexible material (e.g., a thin polymer sheet material). Attached to a top surface of the rim 19 is a lid 38 and filter 30, which may be arranged like that in the FIGS. 1-3 embodiment. That is, the lid 38 may also be made of a relatively flexible material (such as a foil sheet) and carry a filter 30 made of a filter paper that is attached to the lid 38 at a periphery 32 that is spaced inwardly from the rim 19. A beverage medium 20 (not shown) may be contained inside the filter 30 (and/or outside of the filter in the container 12), and an optional flow distributor 33 (not shown) may be provided if desired. This embodiment may provide advantages such as reduced weight and material use, e.g., because of the smaller amount of material used for the container 12. Also, to the extent that the cartridge 10 requires structural support (e.g., to enable proper piercing of the lid 38 for inlet and outlet openings) the rim 19 may provide the needed support without assistance from the container 12. Thus, the FIG. 5 cartridge may be capable of being used in an orientation like that shown in FIG. 4, and the lid 38 and filter 30 may be removed from the rim 19 and the container 12 (e.g., by peeling), if desired.

FIG. 6 shows another illustrative embodiment of a cartridge 10 that incorporates aspects of the invention. In this embodiment, the cartridge 10 includes a lid 38 (e.g., like that described above including a sheet of foil/polymer laminate) that is attached to a filter 30 at a periphery 32. However, in this embodiment, the filter 30 includes an impermeable cylindrical member 34 that extends from the lid 38 and a permeable filter paper 35 that is attached at a bottom of the cylindrical member 34. The lid 38 and filter 30 are associated with the rim 19 and container 12, e.g., by bonding the lid 38 to the rim 19, so that the filter 30 is located in an interior space of the container 12. The container 12 may have any suitable form, e.g., may include a cup-shaped member formed of a molded plastic material. A beverage medium 20 may be located in the cylindrical member 34 so that when liquid is introduced into the cylindrical member 34, beverage may pass through the filter paper 35. Alternately, a beverage medium 20 may be provided in the container 12 and outside of the filter 30. In this case, the filter 30 may help prevent contact of the beverage medium 20 with a liquid inlet and/or help maintain the beverage medium 20 in a particular configuration in the cartridge, e.g., help keep the beverage medium 20 compacted against the sidewall and bottom of the container 12. Where a beverage medium 20 is located outside of the filter 30, water or other liquid may be introduced into the cartridge from an area outside of the filter 30 (e.g., into the second chamber 14b from a portion of the lid 38 outside of the periphery 32), and beverage may exit the cartridge from an area inside of the filter 30 (e.g., from the first chamber 14a via an opening in the lid 38 inside of the periphery 32).

This embodiment helps to illustrate that the filter 30 may be made of two or more components and may include impermeable as well as permeable portions. The impermeable portions may help to direct liquid to flow in desired ways, e.g., in the case of FIG. 6 so that liquid introduced via an opening in the lid 38 must travel along the length of the cylindrical member 34 before exiting through the filter paper 35. In another embodiment, the cylindrical member 34 may be made permeable and the filter paper 35 made impermeable so that liquid flows through the cylindrical member 34 only. In another embodiment, one or more portions of the cylindrical member 34 may be made impermeable (e.g., a cylindrically-shaped band near the lid 38 may be impermeable) and one or more other portions may be made permeable (e.g., a cylindrically-shaped band near the filter paper 35 may be permeable). Of course, these are only a few illustrative embodiments, and other arrangements are possible. For example, the shape, size or configuration of the cylindrical member 34 may be altered, e.g., to be rectangular, triangular, frustoconical, spherical or other shapes. Also, the filter paper 35 may have any shape, size or configuration, e.g., need not be flat and circular, and may be replaced with another permeable element, such as a perforated plastic disc. In short, the filter 30 may be arranged in any suitable way.

Figure 8:
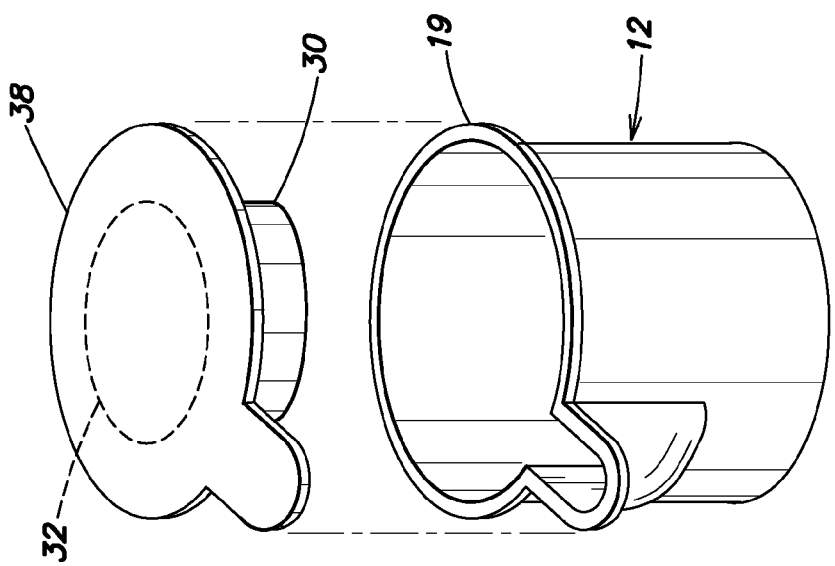
FIG. 8 shows an exploded view of yet another illustrative embodiment of a cartridge in accordance with an aspect of the invention.

FIG. 7 shows another illustrative embodiment of a cartridge 10 with a rectangular shape. In this embodiment, the container 12 is shaped like a rectangular box and has a rectangularly shaped rim 19. The lid 38 and filter 30 (which also has a rectangular box shape) are attached to the rim 19 in a way similar to that described above. This embodiment illustrates that aspects of the invention are not limited to round or circular shapes for the rim 19 and/or other cartridge components. To the contrary, any irregular or other suitable shape for the cartridge components is possible. For example, FIG. 8 shows an embodiment of a cartridge 10 having a rim 19 and container 12 that form a cup shape having a spout-like feature. The lid 38 may have a corresponding shape, and may be arranged so that an outlet opening can be formed in the lid 38 in the spout area of the rim 19 and container 12. This may help with draining of beverage from the container 12, e.g., since with proper orientation of the cartridge, beverage may tend to drain into the spout area. The spout feature or other irregular shape may also provide an indexing or positioning feature that helps to ensure that the cartridge 10 is associated with a beverage machine in a particular way. For example, the cartridge shown in FIG. 8 may be used in an orientation like that shown in FIG. 4 where the spout feature is located at or near the outlet 52. Since the spout can be used to ensure that the cartridge is positioned with the spout at or near the outlet 52, the spout can help in draining beverage from the cartridge to the outlet 52. Using the spout or other indexing feature to ensure cartridge orientation may also help if the cartridge 10 includes readable features, such as a barcode, RFID tag, or other machine readable code. That is, the spout may help ensure the cartridge is rotationally positioned in a particular location so that the readable feature(s) can be properly read by the machine. The spout feature (or other suitable arrangement) may also provide a convenient place for a pull tab to be located for the lid 38 so that the lid 38 and filter 30 may be removed from the rim 19, e.g., by peeling the lid 38 from the rim 19.

Figure 9:
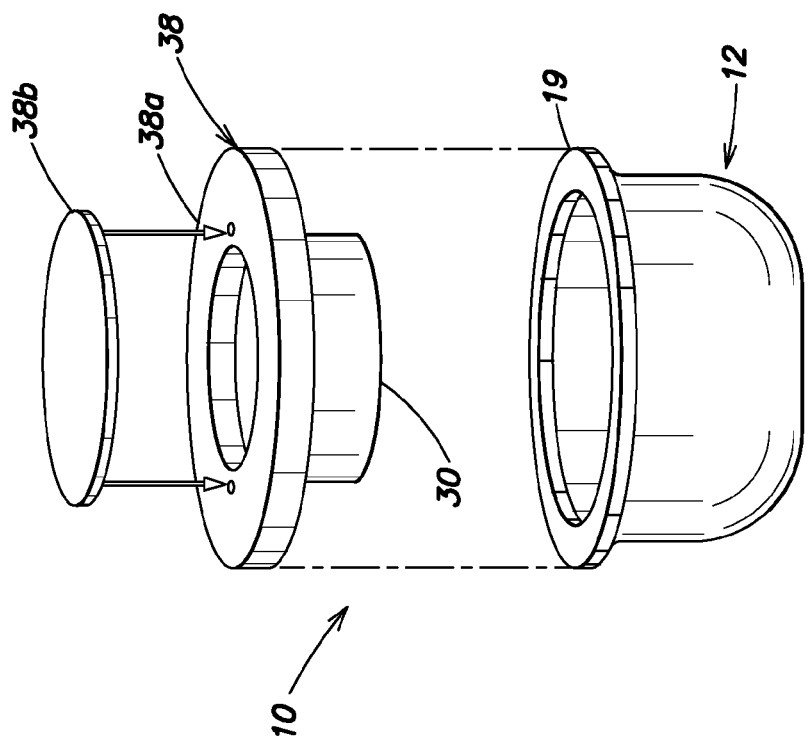
FIG. 9 shows an exploded view of yet another illustrative embodiment of a cartridge in accordance with an aspect of the invention.

FIG. 9 shows yet another illustrative embodiment of a cartridge 10 in which the lid 38 includes two components. Specifically, the lid 38 includes an outer portion 38a that is attached to the rim 19 and an inner portion 38b that is attached to the outer portion 38a (e.g., after a beverage medium is provided into a space defined by the filter 30). This embodiment may provide an advantage of allowing at least a portion of the lid to be attached to the rim 19 and the container 12 prior to placement of beverage media 20 into the cartridge 10. That is, the outer portion 38a of the lid 38 may be attached to the rim 19 with the filter 30 attached to the outer portion 38a, but without the inner portion 38b of the lid 38 in place. Thereafter, beverage media 20 may be provided through the opening in the outer portion 38a and the inner portion 38b attached to the outer portion 38a so as to close the opening. The outer portion 38a and the inner portion 38b may be made of different materials, e.g., the outer portion 38a may be made of a relatively thick and stiff plastic material and the inner portion 38b may be made of a relatively thin and flexible foil material. In this case, the outer portion 38a may provide structure for the cartridge 10, allowing the rim 19 to be made of a relatively flexible and/or thin material, e.g., the rim 19 may be a portion of the container 12 that is bonded to the outer portion 38a where the container 12 is made of a thin polymer sheet material.

Figure 10:
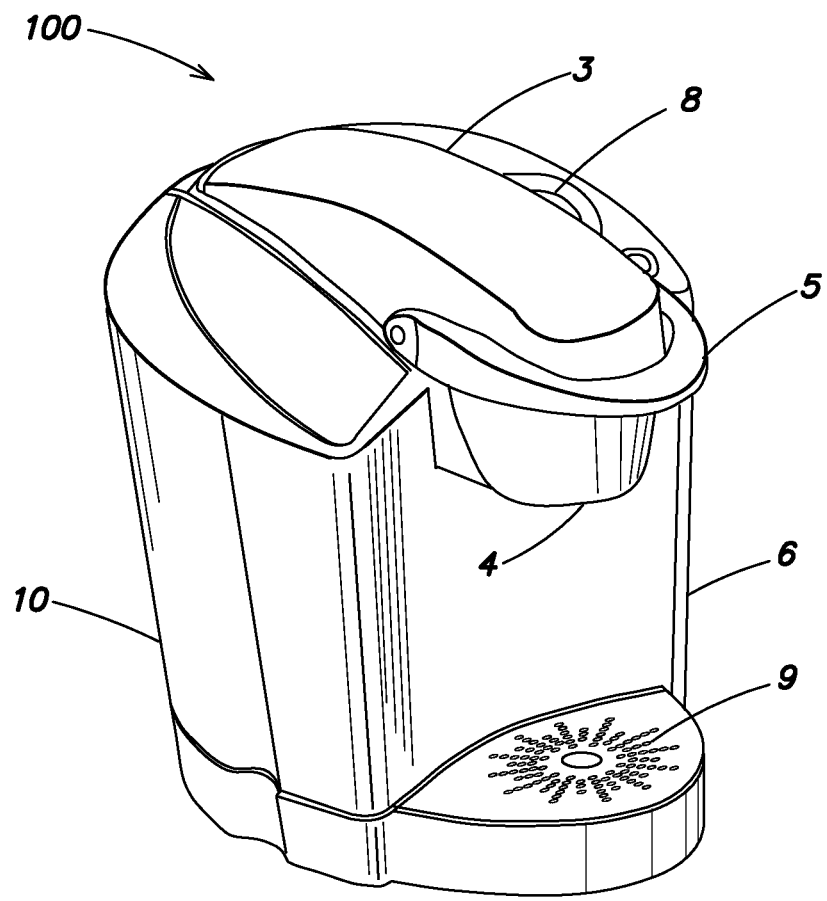
FIG. 10 is a perspective view of a beverage machine usable in accordance with aspects of the invention.

Cartridges in accordance with aspects of the invention may be used with any suitable beverage machine. For example, FIG. 10 shows a perspective view of a beverage forming apparatus 100 that may be used to form any suitable beverage, such as tea, coffee, other infusion-type beverages, beverages formed from a liquid or powdered concentrate, hot or cold drinks, etc. In this illustrative embodiment, the apparatus 100 includes an outer frame or housing 6 with a user interface 8 that the user may operate to control various features of the apparatus 100. A beverage cartridge 10 may be provided to the apparatus 100 and used to form a beverage that is deposited into a cup or other suitable receptacle that is placed on a drip tray 9 or other support, if any. The cartridge 10 may be manually or automatically placed in a cartridge receiving portion defined by first and second portions 3 and 4 of the beverage forming apparatus 100. For example, by lifting a handle 5, the user may move the first and second portions 3 and 4 to an open position to expose a suitably shaped area in which the cartridge 10 may be placed. After placement of the cartridge 10, a handle 5 or other actuator may be moved in a manual or automatic fashion so as to move the first and second portions 3 and 4 to a closed position (shown in FIG. 10), thereby at least partially enclosing the cartridge 10 within a brew chamber. It should be understood, however, that the cartridge 10 may be received in any suitable way by the apparatus 100, as the way in which the apparatus 100 receives or otherwise uses the cartridge 10 is not critical to aspects of the invention.

Once the cartridge 10 is received, the beverage forming apparatus 100 may use the cartridge 10 to form a beverage. For example, one or more inlet needles 50 (see FIG. 3 or 4) associated with the first or second portion 3, 4 may pierce the cartridge 10 so as to inject heated water or other liquid into the cartridge 10. The first or second portion 3, 4 may also include one or more outlet needles or other elements 52 to puncture or pierce the cartridge 10 (as needed) at an outlet side to permit the formed beverage to exit the cartridge 10.

Figure 11:
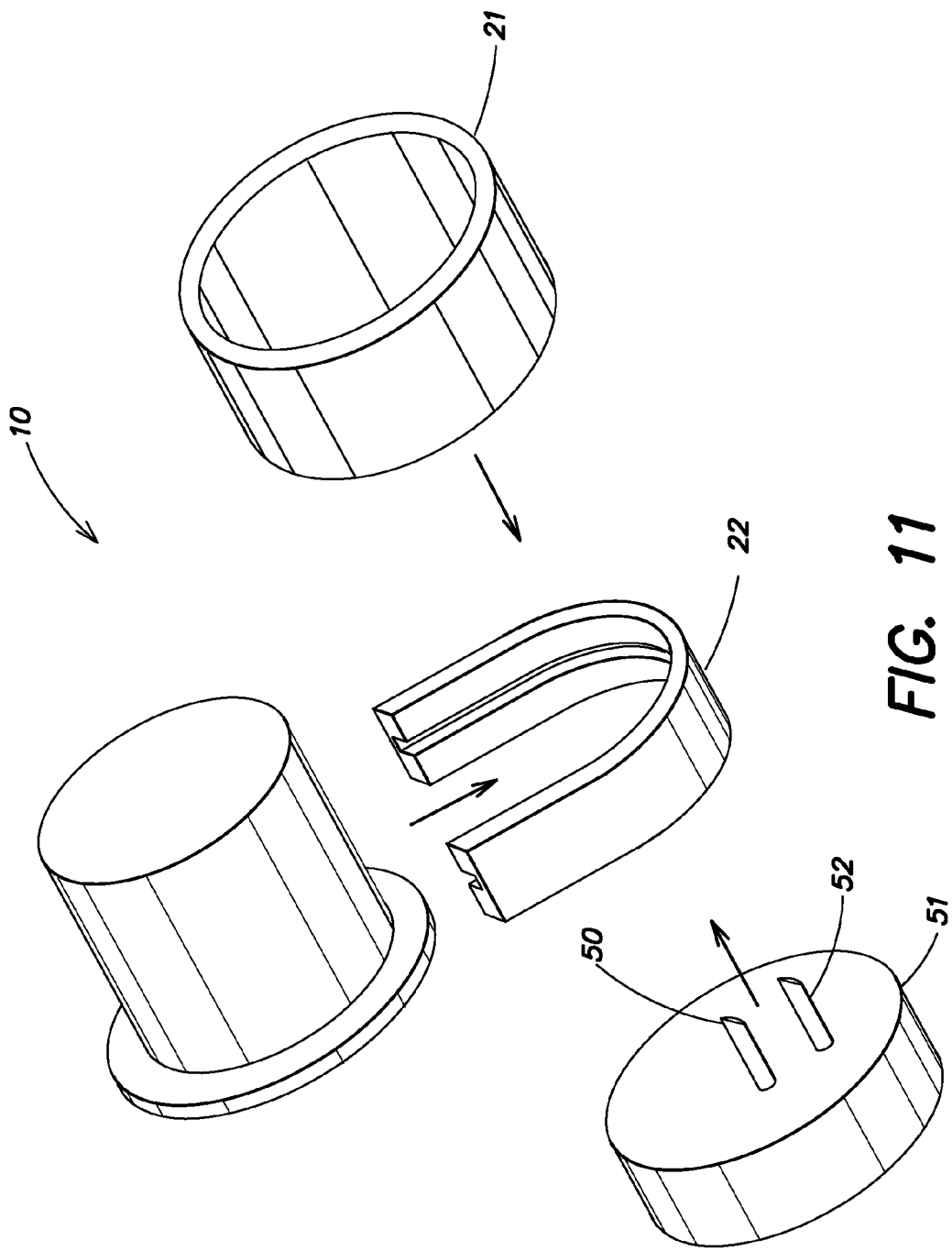
FIG. 11 shows a schematic diagram of components of a brew chamber of a beverage machine in an illustrative embodiment.

FIG. 11 shows a schematic diagram of a brew chamber arrangement that may be used in the beverage forming apparatus 100. In this illustrative embodiment, the first portion 3 includes a clamp 21 that is movable relative to a cartridge receiver 22. The second portion 4 includes a base 51 that is also movable relative to the cartridge receiver 22 and carries inlet and outlet needles 50 and 52. To enclose a cartridge 10 in the brew chamber, the cartridge 10 is first placed into the cartridge receiver 22 so the cartridge is held stationary by the receiver 22. In this embodiment, the receiver 22 includes a groove that engages with the rim 19 of the cartridge 10, but the receiver 22 may hold the cartridge in other ways, such as by engaging the container 12. Thereafter, the clamp 21 and the base 51 are moved toward the cartridge receiver 22 so that the clamp 21 engages with the rim 19 of the cartridge 10 and presses the rim 19 into contact with the base 51. This engagement may help form a seal between the base 51 and the rim 19 and the lid 38, e.g., to help prevent leaking of liquid from the inlet or outlet needles 50 and 52. Pressing the rim 19/lid 38 into contact with the base 51 may also cause the needles 50 and 52 to pierce the lid 38 to form inlet and outlet openings. With the cartridge suitably held, water or other liquid may be introduced into the cartridge 10 by the inlet needle 50 and beverage received from the cartridge by the outlet needle 52.

Those of skill in the art should appreciate that various modifications to this illustrative brew chamber arrangement may be made. For example, the base 51 may carry two or more inlet or outlet needles 50 and 52, the needles 50 and 52 may be replaced with knives, blades, conical structures, one or more tubes, openings in the base 51 for inlet/outlet flow and/or any other suitable inlet and outlet arrangement, the piercing elements (if provided) may be made retractable with respect to the base, the base 51 may be made to remain stationary and the cartridge moved relative to the base 51, and so on. Similarly, the clamp 21 may have any suitable shape other than a ring-like shape shown, e.g., the clamp 21 may have a cup-like shape, the clamp 21 may be made stationary and the cartridge 10 and/or the base 51 moved relative to the clamp 21, the clamp 21 and the cartridge retainer 22 may be integrated together, and others. Also, although in this embodiment the cartridge retainer 22 holds the cartridge 10 in an inverted orientation with the lid 38 below the container 12 (like that in FIG. 4) the cartridge may be used to make a beverage in any suitable orientation.

Figure 12:
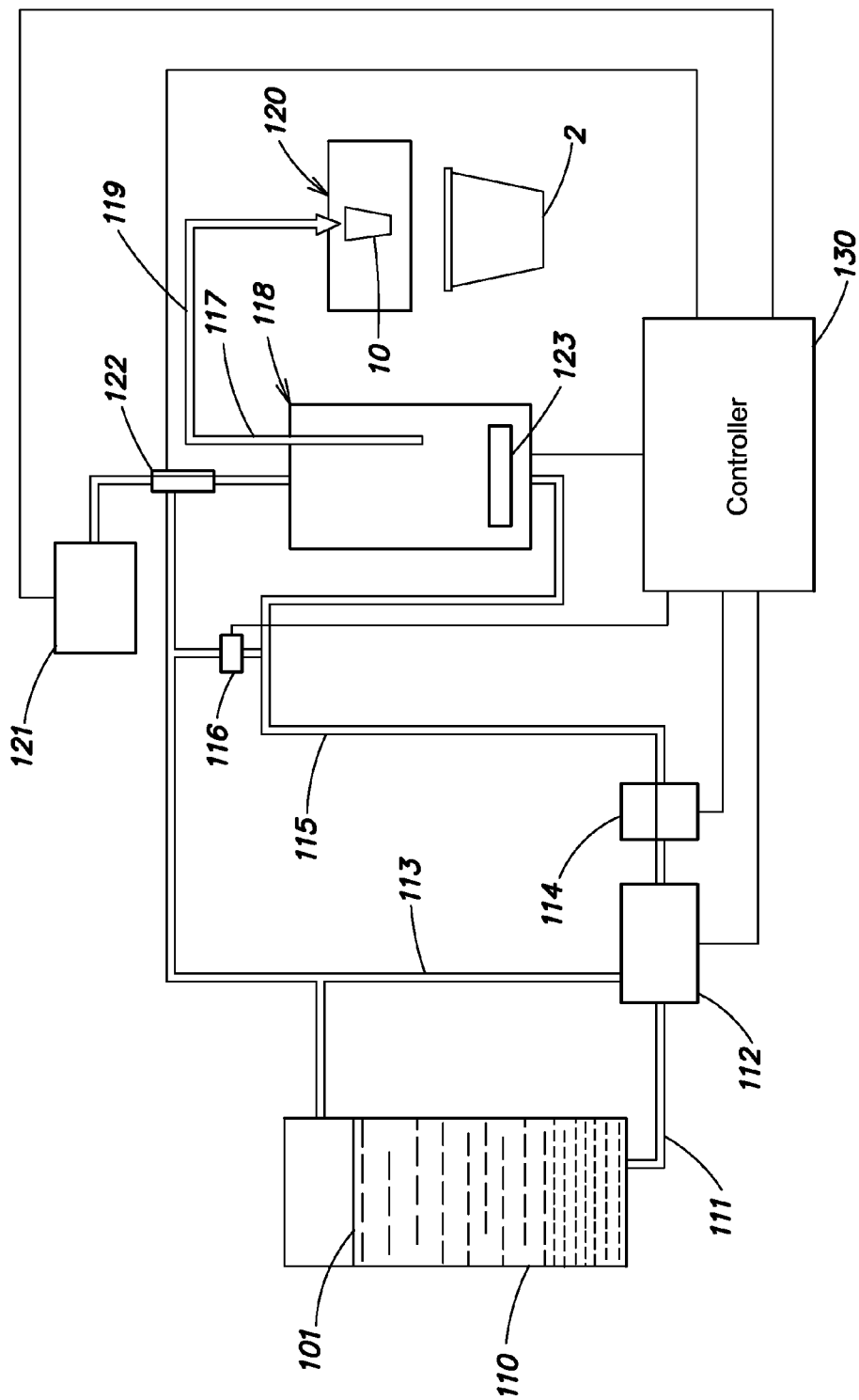
FIG. 12 is a schematic block diagram of components of a beverage machine usable in accordance with aspects of the invention.

FIG. 12 shows a schematic block diagram of various components included in a beverage forming apparatus 100 in one illustrative embodiment, such as that in FIG. 10. Those of skill in the art will appreciate that a beverage forming apparatus 100 may be configured in a variety of different ways, and thus aspects of the invention should not be narrowly interpreted as relating only to one type of beverage forming apparatus. Water or other liquid from a storage tank 110 may be provided via a supply conduit 111 to a pump 112 (such as a centrifugal pump, piston pump, solenoid pump, etc.), which pumps the liquid via a pump conduit 115 to a metering tank or chamber 118. Operation of the water pump 112 and other components of the apparatus 100 may be controlled by a controller 130, e.g., including a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions. The metering tank 118 may be filled with a desired amount of liquid by any suitable technique, such as running the pump 112 for a predetermined time, sensing a water level in the metering tank 118 using a conductive probe sensor or capacitive sensor, detecting a pressure rise in metering tank 118 when the liquid fills the tank, or using any other viable technique. For example, the controller 130 may detect that the metering tank 118 is completely filled when a pressure sensor detects a rise in pressure indicating that the water has reached the top of the metering tank 118. Water in the tank may be heated, if desired, by way of a heating element 123 whose operation is controlled by the controller 130 using input from a temperature sensor or other suitable input. Water in the metering tank 118 may be dispensed via a metering tank conduit 119 to a brew chamber 120 or other beverage forming station. The brew chamber 120 may include any beverage making ingredient, such as ground coffee, tea, a flavored drink mix, or other substance, e.g., contained in a cartridge 10. Liquid may be discharged from the metering tank 118 by pressurizing the metering tank with air provided by an air pump 121 that causes the liquid to be discharged out of a tube 117 and into the metering tank conduit 119. Completion of the dispensing from the metering tank 118 may be detected in any suitable way, such as by detecting a pressure drop in the metering tank 118, by detecting a water level change in the metering tank 118, use of a flow meter, or using any other viable techniques. Liquid may alternately be discharged from the metering tank 118 by the pump 112 operating to force additional liquid into the tank 118, thereby displacing water out of the tank 118 and to the brew chamber. A flow sensor or other suitable device may be used to determine the amount of liquid delivered to the tank 118, and thus the amount of liquid delivered to the brew chamber. Alternately, the pump 12 may be a piston-type or metering pump such that a known volume of liquid may be delivered from the pump 112 to the tank 118, thus causing the same known volume to be delivered to the brew chamber 120. Liquid may be introduced into the cartridge 10 at any suitable pressure, e.g., 1-2 psi or higher.

Figure 13:
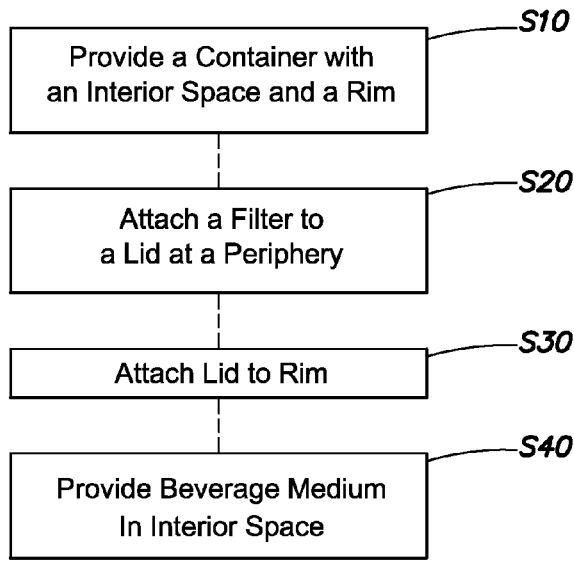
FIG. 13 shows steps in a method of manufacturing a cartridge in accordance with aspects of the invention.
Figure 14:
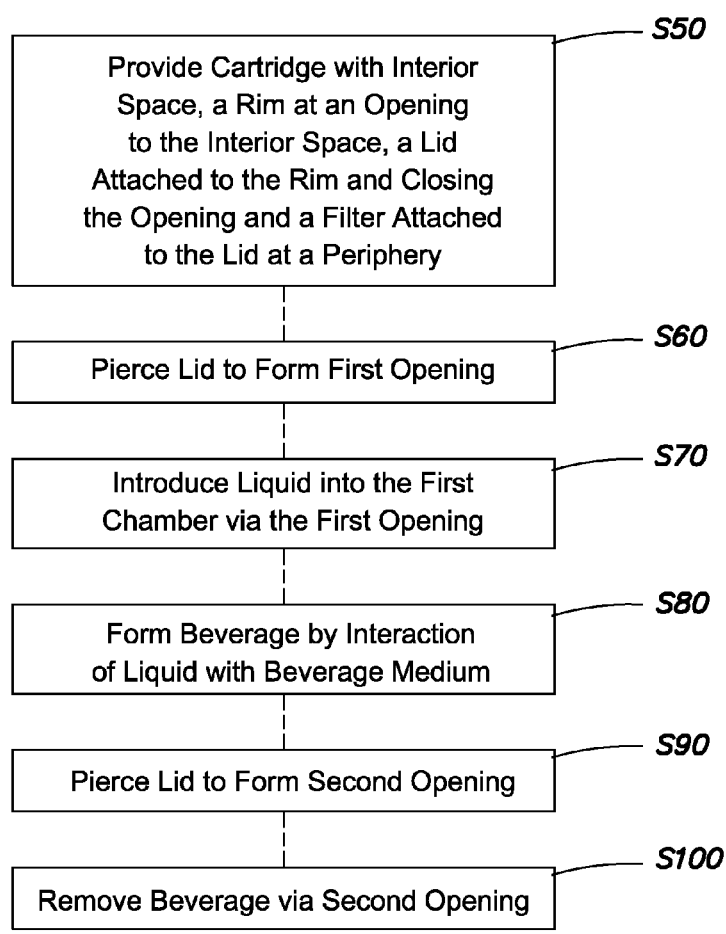
FIG. 14 shows steps in a method of preparing a beverage in accordance with aspects of the invention.

Another aspect of the invention includes a method of manufacturing a cartridge. Steps of one such illustrative method are shown in FIG. 13. (The steps in FIGS. 13 and 14 are shown connected in dashed line so as to indicate that the steps of the method may be performed different orders other than that shown, as described in more detail below.) In step S10, a container having an interior space and a rim defining an opening into the interior space is provided. The container may be made of any suitable material, such as plastic, paper, metal and combinations of materials. Generally, the container is impermeable to liquid so that beverage created in the cartridge can be removed in a controlled way, but may have permeable portions. Also, the container may have any suitable shape, such as frustoconical, spherical, cylindrical, a rectangular box, and so on. Moreover, the container need not have a defined shape, and instead may be made of a flexible material.

In step S20, a filter is attached to a lid at a periphery. The periphery is a closed boundary line where the filter is attached to the lid and extends away from the lid (e.g., into an interior space of the container). The filter may include any suitable material, such as filter paper, permeable or impermeable plastic material, a sponge like material, and so on. Also, the filter may include impermeable as well as permeable elements. For example, an impermeable plastic element may be attached to the lid and provide structural support for a filter paper or other material that is attached to the plastic element. The filter can have any suitable shape, size and/or permeability. For example, the filter may have areas of different permeability so as to prevent or restrict flow through some areas of the filter while facilitating flow through other, more permeable areas. Generally, the filter is unattached to the container, e.g., so that the filter and lid can be removed from the container for recycling and/or composting purposes. However, in some embodiments the filter may be attached to the rim, e.g., a portion of the filter may be sandwiched between the lid and the rim.

In step S30, the lid is attached to the rim (e.g., to at least partially close the opening) and such that the periphery is spaced away from the rim and the filter extends from the periphery into the interior space. The filter may be arranged to separate a first chamber from a second chamber in the interior space. The lid may be attached to the rim in any suitable way, such as thermal or acoustic welding, adhesive, chemical bonding, mechanical bonding, and so on. In some embodiments, the rim may include a groove or other feature that assists in removal of the lid from the rim. The lid may be made of any suitable material, such as a foil, a foil and polymer laminate, a polymer material, and so on, and may be permeable or impermeable. However, the lid generally is made of an impermeable material so as to aid in controlling the flow of liquid in the cartridge.

In step S40, a beverage medium is provided in the interior space of the cartridge, e.g., into a first chamber that is separated from a second chamber by the filter. The beverage medium may be arranged to interact with liquid introduced into the container to form a beverage, and may include roast and ground coffee, leaf tea, instant coffee or tea, hot chocolate mix, a powdered drink mix, dried fruit materials, sweetener, creamer, thickener, and/or any other suitable material for forming a beverage.

It should be understood that steps in the method outlined in FIG. 13 may be performed in any suitable order. For example, in one embodiment, the beverage medium may be provided in a space defined by the filter before the filter is attached to the lid. In another embodiment, the beverage medium may be provided into a space defined by the filter after the filter is attached to the lid. For example, the lid may be attached to the lid and the beverage medium provided into a space defined by the filter through an opening in the filter. Thereafter, the opening in the filter may be closed, e.g., by sealing edges of the filter around the opening to each other. In another embodiment, the filter may be attached to the lid, e.g., like that shown in FIG. 9, and beverage medium provided into a space defined by the filter either before or after the lid is attached to the container rim.

Another aspect of the invention involves a method for forming a beverage, e.g., as outlined in FIG. 14. In step S50, a cartridge is provided having a container with an interior space, a rim defining an opening to the interior space, a lid attached to the rim and closing the opening of the container, and a filter attached to the lid at a periphery that is spaced inwardly and away from the rim. The filter extends from the periphery into the interior space and separates first and second chambers in the interior space. A beverage medium is located in the interior space, e.g., in the first and/or second chamber, and is arranged to interact with liquid introduced into the container to form a beverage. As discussed above, the container, rim, lid and filter may be made of any suitable material and in any suitable way. Similarly, the beverage medium may include any suitable materials for forming a beverage.

In step S60, the lid is pierced, e.g., near a center of the lid and away from the rim, to form a first opening to access the first chamber. Piercing of the lid may be done by inserting a needle, blade, knife or other suitable object through the lid, introducing water or other pressure to the lid to cause the lid to rupture or a valve or other structure to open for flow, and so on. In step S70, liquid is introduced into the first chamber via the first opening, e.g., by injecting heated, pressurized water through a needle that pierced the lid to form the first opening. Other techniques may be used to introduce liquid into the first chamber, such as inserting a tube through the first opening, mating an opening in a plate or other member to the lid near the first opening, and so on.

In step S80, beverage formed by interaction of the liquid with the beverage medium flows through the filter to the second chamber. Flow of the beverage through the filter may remove particulate matter from the beverage, such as larger coffee grounds, tea leaves or other. In step S90, the lid is pierced to form a second opening to access the second chamber where the second opening is located nearer the rim than the first opening and is between the periphery and the rim. As discussed above, a piercing element may remain engaged with the cartridge after piercing, or may withdraw to allow beverage to exit through the formed opening. Finally, in step S 100, the beverage is removed from the cartridge via the second opening.

The method outlined in FIG. 14 may include additional steps, such as engaging the rim with a clamping mechanism prior to introducing liquid into the first chamber. For example, the cartridge may be engaged by a brew chamber arrangement like that in FIG. 11 such that the rim of the cartridge is clamped in place so as to reduce the likelihood of the lid being separated from the rim during brewing and/or to reduce the likelihood of leakage. The lid and/or container may also be pierced to form a third opening to vent the interior space. This may be useful to help flood the interior space of the cartridge with liquid. The cartridge may be positioned so that the lid is in a downward facing orientation with the container above the lid and the lid in a plane that is transverse to a horizontal plane, e.g., like that shown in FIG. 11. The plane in which the lid is oriented may be at an angle of about 20 degrees to 70 degrees to the horizontal plane, which may help the beverage formation as discussed above. The cartridge may include a flow distributor, e.g., attached to the lid between the lid and the beverage medium, to help distribute liquid introduced into the cartridge in a desired way. Subsequent to beverage formation, the lid may be peeled by hand from the rim so as to remove the lid, the filter and the beverage medium as a single unit from the container. For example, the lid may have a tab or other structure that may be grasped between thumb and forefinger and used to peel the lid from the rim of the cartridge. Since the filter and beverage medium may be attached to the lid, the filter and any remains of the beverage medium after beverage formation may be easily removed from the container, e.g., so the container can be recycled and the beverage medium remains and filter composted.

Also, the steps in the method outlined in FIG. 14 may be performed in orders different than that shown in FIG. 14. For example, steps S60 and S90 may be performed simultaneously, or step S90 may be performed before step S60.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for forming a beverage, comprising:
providing a cartridge having a container with an interior space having first and second chambers, a rim defining an opening to the interior space, a lid attached to the rim and closing the opening of the container, a filter attached to the lid at a periphery that is spaced inwardly and away from the rim, the filter extending from the periphery into the interior space and separating the first and second chambers, the filter being otherwise unattached to the container, and a beverage medium in the interior space that is arranged to interact with liquid introduced into the container to form a beverage;
piercing the lid near a center of the lid and away from the rim to form a first opening to access the first chamber;
introducing liquid into the first chamber via the first opening;
forming a beverage by interaction of the liquid with the beverage medium;
piercing the lid to form a second opening to access the second chamber, the second opening being located nearer the rim than the first opening and between the periphery and the rim; and
removing the beverage from the cartridge via the second opening.

2. The method of claim 1, further comprising:
engaging the rim with a clamping mechanism prior to introducing liquid into the first chamber.

3. The method of claim 1, further comprising:
piercing the lid to form a third opening to vent the interior space.

4. The method of claim 1, wherein the lid includes a foil and is more easily pierced than the container.

5. The method of claim 1, wherein the second opening is formed in an annular portion of the lid between the periphery and the rim.

6. The method of claim 1, wherein the beverage medium is located in the first chamber, and the step of introducing comprises:
passing liquid through a flow distributor into a portion of the first chamber where the beverage medium is located.

7. The method of claim 6, wherein the flow distributor is attached to the lid in the interior space.

8. The method of claim 1, wherein the beverage medium is located in the second chamber, the method further comprising forming a beverage in the second chamber that interacts with liquid flowing from the first chamber to the second chamber.

9. The method of claim 1, wherein the beverage medium is located in the first chamber, the method further comprising:

peeling the lid by hand from the rim so as to remove the lid, the filter and the beverage medium as a single unit from the container.

10. The method of claim 1, wherein the beverage medium is located in the first chamber, the method further comprising:
   flowing beverage formed by interaction of the liquid with the beverage medium through the filter to the second chamber.

11. The method of claim 1, wherein the lid consists of a sheet of flexible material.

12. The method of claim 11, wherein the sheet of flexible material is a foil and polymer laminate.

13. A method for forming a beverage, comprising:
   providing a cartridge having a container with an interior space having first and second chambers, a rim defining an opening to the interior space, a lid attached to the rim and closing the opening of the container, a filter attached to the lid and extending into the interior space and separating the first and second chambers, and a beverage medium in the interior space that is arranged to interact with liquid introduced into the container to form a beverage;
   piercing the lid near a center of the lid and away from the rim to form a first opening to access the first chamber, piercing of the lid to form the first opening being done with the lid positioned above the container;
   introducing liquid into the first chamber via the first opening;
   forming a beverage by interaction of the liquid with the beverage medium;
   piercing the lid to form a second opening to access the second chamber, the second opening being located nearer the rim than the first opening, piercing of the lid to form the second opening being done with the lid positioned above the container; and
   removing the beverage from the cartridge via the second opening.

14. The method of claim 13, wherein the beverage medium is located in the first chamber, and the step of introducing comprises:
   passing liquid through a flow distributor into a portion of the first chamber where the beverage medium is located.

15. The method of claim 14, wherein the flow distributor is attached to the lid in the interior space.

16. The method of claim 13, wherein the beverage medium is located in the second chamber, the method further comprising forming a beverage in the second chamber that interacts with liquid flowing from the first chamber to the second chamber.

17. The method of claim 13, wherein the beverage medium is located in the first chamber, the method further comprising:
   peeling the lid by hand from the rim so as to remove the lid, the filter and the beverage medium as a single unit from the container.

18. The method of claim 13, wherein the beverage medium is located in the first chamber, the method further comprising:
   flowing beverage formed by interaction of the liquid with the beverage medium through the filter to the second chamber.

19. The method of claim 13, wherein the lid consists of a sheet of flexible material.

20. The method of claim 19, wherein the sheet of flexible material is a foil and polymer laminate.

* * * * *

UNITED STATES PATENT AND TRADEMARK OFFICE
CERTIFICATE OF CORRECTION

| | | |
|---|---|---|
| PATENT NO. | : 9,555,957 B2 | Page 1 of 1 |
| APPLICATION NO. | : 13/713361 | |
| DATED | : January 31, 2017 | |
| INVENTOR(S) | : Karl T. Winkler et al. | |

It is certified that error appears in the above-identified patent and that said Letters Patent is hereby corrected as shown below:

On the Title Page

In the Section "Related U.S. Application Data," please replace "Sep. 2, 210" with -- Sep. 2, 2010 --

Signed and Sealed this
Sixteenth Day of May, 2017

Michelle K. Lee
*Director of the United States Patent and Trademark Office*